United States Patent [19]
Sasaki et al.

[11] 3,802,563
[45] Apr. 9, 1974

[54] WATER PURIFYING DEVICE

[75] Inventors: Sigeru Sasaki; Tamotsu Nishikawa, both of Fukuoka, Japan

[73] Assignee: Matsushita Electric Industrial Co., Ltd., Osaka, Japan

[22] Filed: Dec. 20, 1971

[21] Appl. No.: 209,966

[30] Foreign Application Priority Data
Dec. 23, 1970 Japan............................ 45-118072

[52] U.S. Cl............. 210/120, 137/610, 137/625.11, 137/625.4 B, 137/DIG. 2, 210/281, 210/288, 210/424, 210/472, 251/124
[51] Int. Cl....................... B01d 35/02, B01d 29/38
[58] Field of Search............ 137/DIG. 2, 552.5, 610, 137/625.11, 625.41–625.48, 625.5; 251/77, 84, 124, 129; 210/120, 281, 288, 429, 424, 439, 460, 436, 472, 282

[56] References Cited
UNITED STATES PATENTS
3,653,514   4/1972   Holler et al..................... 210/424 X
3,064,684   11/1962  Hutton......................... 137/625.5 X
3,473,663   10/1969  Winslow............................ 210/120
3,057,375   10/1962  Etter.............................. 137/552.5
3,442,390   5/1969   Petrucci et al.................. 210/436 X
3,385,446   5/1968   Ward et al...................... 210/282 X Primary Examiner—John Adee
Assistant Examiner—Robert H. Spitzer
Attorney, Agent, or Firm—Robert J. Frank

[57] ABSTRACT

A water purifying device comprising a filter unit having a filter element disposed therein and a purified water discharge tube connected thereto, a directional control valve unit having two water outlet ports and an externally operable valve ball disposed therein, and a hose communicating one of the water outlet ports with the filter unit, said directional control valve unit being fixedly mounted on a faucet and the valve ball being externally operated to alternately open and close the water outlet ports, whereby city water and purified water can be selectively obtained as desired.

2 Claims, 10 Drawing Figures

WATER PURIFYING DEVICE

This invention relates to a water purifying device which is adapted for use in ordinary households and enables city water and purified water to be selectively freely obtained.

Conventional water purifying devices of the type described have had the disadvantage that the selective use of city water and purified water is impossible and, where city water is desired to be used, a hose connecting a filter unit with a faucet must be disconnected from the faucet or otherwise, two faucets must be provided, one for obtaining city water and one for supplying city water to the filter unit. There has been proposed a type of water purifying device which comprises a directional control valve unit mounted on a faucet for changing the flow direction of city water to selectively obtain city water and purified water. However, this type of prior art device has had the disadvantages that the operation of the valve unit is not always reliable and city water leaks from the valve unit while purified water is being obtained, and that the valve unit becomes unserviceable in a relatively short period of time due to wear of the valve element disposed therein. In addition, the valve unit has been complicated in construction and hence difficult to manufacture, and the mounting of the valve unit on the faucet has also been difficult. Furthermore, these conventional water purifying devices have had the disadvantages, among others, that, since the filter unit must be set on a cooking table or shelf adjacent a sink, it interferes with cooking or storage of cooking instruments, that active carbon powder contained in a filter cloth in the filter unit tends to move out of the filter unit during transportation of said filter unit, and further that the water purifying device cannot be put in use unless a layer of active carbon powder is first formed on the surface of the filter cloth at the manufacturing plant.

The present invention proposes a water purifying device which comprises a filter unit having a filter element disposed therein, a directional control valve unit having two water outlet ports and provided therein with a valve ball, and a hose communicating said filter unit with one of the two water outlet ports of said directional control valve unit, said directional control valve unit being fixedly mounted on a faucet and said valve ball being externally operated by an operating rod to alternately open and close said two water outlet ports, whereby service water and purified water can be selectively obtained.

An object of the present invention is to provide a water purifying device of the type described above, wherein the valve ball is movably mounted on a valve seat having through-holes respectively communicating with the two water outlet ports, and is rolled on said valve seat to alternately close said two water outlet ports, whereby the flow direction of service water can be changed smoothly, one of which water outlet ports can be positively closed watertight, the friction of the parts can be eliminated and hence the valve unit can be used semi-permanently, and service water and purified water can be selectively obtained in a simple manner.

Another object of the invention is to provide a water purifying device of the type described, wherein said directional control valve unit includes a mounting box fixedly mounted on the water discharge end of the faucet, a valve box screwed into said mounting box with a packing intervening therebetween, the upper surface of said packing being held in pressure contact with the edge of said faucet, a valve ball shifting member embracing the valve ball, a valve ball operating rod connected to said shifting member and projecting outwardly through the opposite side walls of said valve box, and O-rings sealing the operating rod penetrating portions of the valve box, whereby the mounting of said valve unit is simplified and the directional control of service water to obtain service water or purified water can be attained by a single step of operation, and further an outward leakage of service water from the valve unit can be prevented.

Still another object of the invention is to provide a water purifying device of the type described, wherein the filter unit is mounted on a mounting bracket which is secured to a corner of a sink by means of suction cups, whereby the cooking operation is not interfered with and the cooking space is not reduced by the filter unit, the fall of the filter unit into the sink can be prevented and further the filter unit can be located at any corner of the sink.

Still another object of the invention is to provide a water purifying device of the type described, wherein said filter unit includes a filter case, a filter cloth case having a water inlet hole and a vent hole, a filter cloth disposed in said filter cloth case, active carbon powder disposed between said filter cloth case and said filter cloth, and a purified water discharge tube connected to said filter cloth, said water inlet hole and said vent hole being initially closed with sheets of water-soluble paper respectively, whereby the scattering of the active carbon powder outwardly of the filter case during transportation of said filter case can be prevented and, when water is introduced for the first time into the filter unit, the sheets of watersoluble paper are dissolved by the water and a layer of active carbon powder is automatically formed on the outer surface of said filter cloth by the water flowing into the filter case, so that, at the manufacturing plant, it is unnecessary to form a layer of active carbon powder on the surface of the filter cloth and it is only necessary to charge active carbon powder into the filter case.

Still another object of the invention is to provide a water purifying device of the type described, wherein said filter case is provided with valve means adapted to be actuated by a high pressure built up within the filter case, whereby when an abnormally high pressure is built up within the filter case, said pressure is released to the outside through said valve means to prevent a breakage of said filter case and let the user know of the fact that the filtering efficiency has been lowered due to the clogging of the filter elements.

Figure 1:
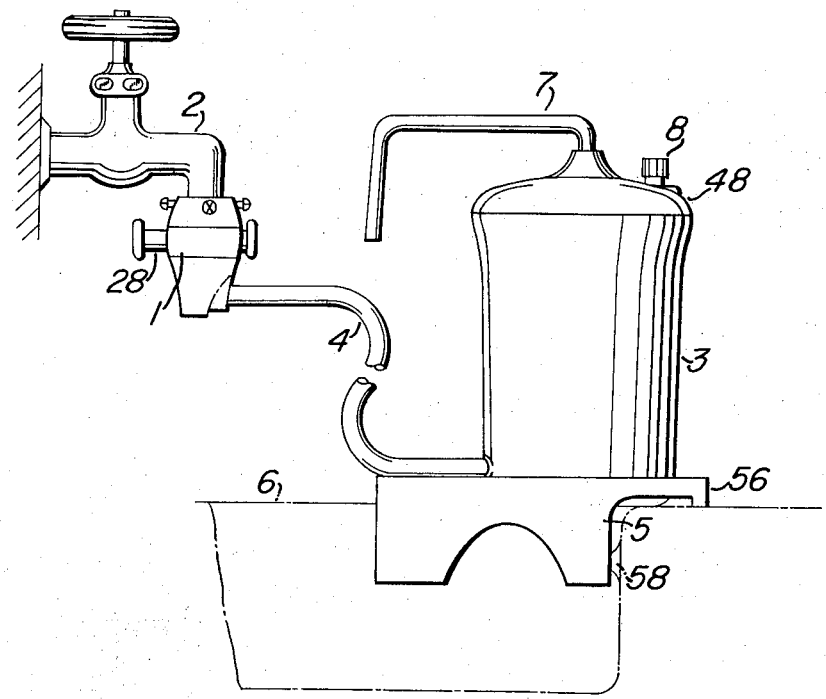
FIG. 1 is a schematic view showing the layout of an embodiment of the water purifying device according to the present invention.

The present invention will be described in detail hereinafter with reference to an embodiment thereof shown in the drawings. Referring to FIG. 1, reference numeral 1 designates a directional control valve unit mounted on the end of a faucet 2 from which service water or pumped well water is supplied. The directional control valve unit 1 communicates with a filter unit 3 by a hose 4. The filter unit 3 is set at a corner of a sink 6 by a mounting bracket 5, and provided with a purified water discharge tube 7 and valve means 8.

Figure 2:
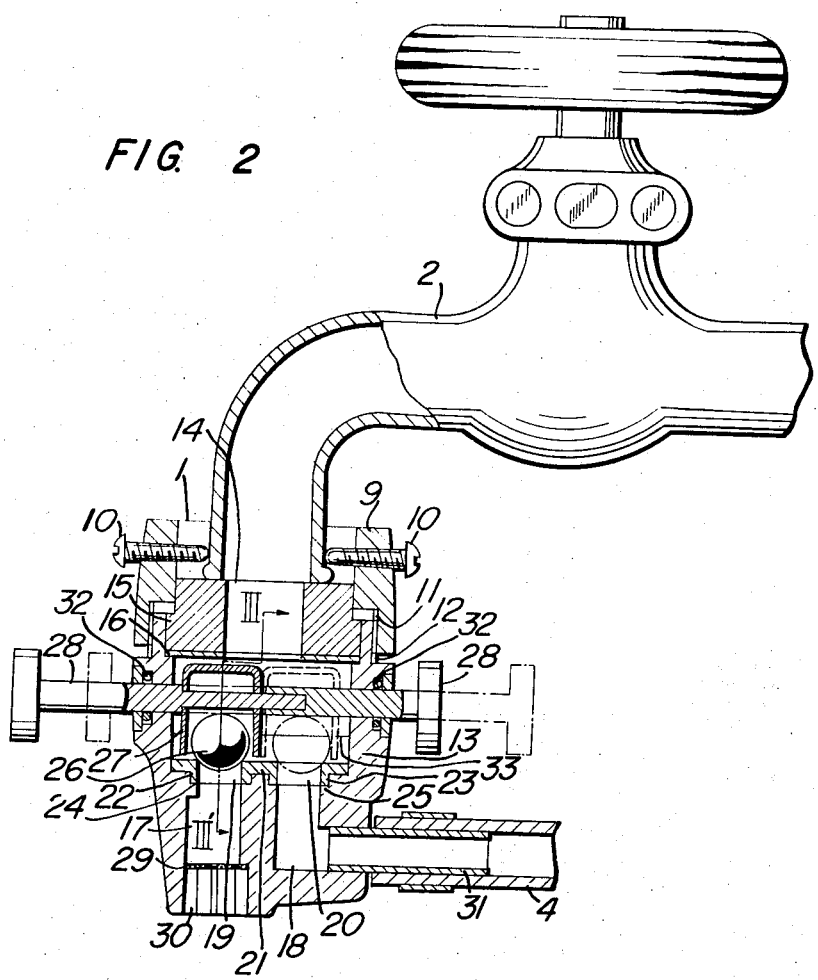
FIG. 2 is a sectional view of the directional control valve unit.
Figure 3:
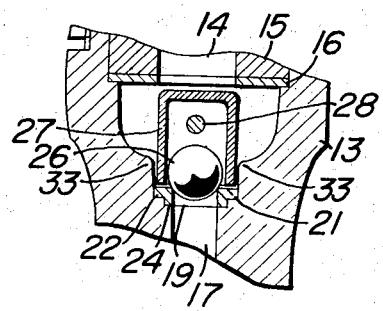
FIG. 3 is a sectional view looking in the direction of the arrows III–III' of FIG. 2.

The construction of the directional control valve unit 1 will be described with reference to FIGS. 2 and 3. The directional control valve unit 1 includes a mounting box 9 fixedly connected to the end of the faucet 2 by means of small bolts 10. A valve box 13 having external threads 12 at the upper portion thereof is screwed into internal threads 11 formed at the lower portion of said mounting box 9. A packing 15 is interposed between the valve box 13 and the mounting box 9, with its upper surface in pressure contact with the discharge end of the faucet 2, said packing having a water passage opening 14 at the center thereof and resting on a support plate 16. The valve box 13 is provided with two water outlet ports, i.e., a water outlet port 17 for discharging service water and a water outlet port 18 for communication with the filter unit 3. A valve seat 21 is provided above the outlet ports 17, 18, which are formed with through-holes 19, 20 communicating with said outlet ports 17, 18 respectively. Downward annular projections 22, 23 are formed along the peripheral edges of the through-holes 19, 20 of the valve seat 21, while upward annular steps 24, 25 are formed along the upper peripheral edges of the outlet ports 17, 18, and said annular projections 22, 23 are received in the upper ends of said outlet ports 17, 18, resting on said annular steps 24, 25 respectively. A valve ball 26 of a size large enough to sealingly close one of the through-holes 19, 20 communicating with the outlet ports 17, 18 is movably mounted on the upper surface of the valve seat 21. Reference numeral 27 designates a valve ball shifting member embracing the valve ball 26, and a horizontally reciprocable operating rod 28 is connected to the opposite side walls of the valve ball shifting member 27, said operating rod 28 projecting outwardly through the side wall of the valve box 13. By manually reciprocating the operating rod 28, the shifting member 27 is moved and the valve ball 26 embraced by said shifting member 27 is rolled on the valve seat 21. Thus, it will be understood that the outlet ports 17, 18 can be alternately closed by the valve ball 26. The outlet port 17 for discharging service water is open in the lower surface of the valve box 13, and a flow equalizing screen 29 and a flow equalizing plate 30 are mounted in the lower open end of the outlet port 17. The outlet port 18 for communication with the filter unit is bent in an L-shape and a nipple 31 is fitted into the open end thereof, by which the hose 4 is connected to the valve unit 1. Reference numeral 32 designates O-rings provided in the wall of the valve unit at the portions where the operating rod penetrates, to prevent an outward leakage of water. Reference numeral 33 designates an inwardly projecting wall portion of the valve box 13 to prevent the valve ball shifting member from inclining, and a slight gap is formed between said projecting wall and said valve ball shifting member 27.

Figure 4:
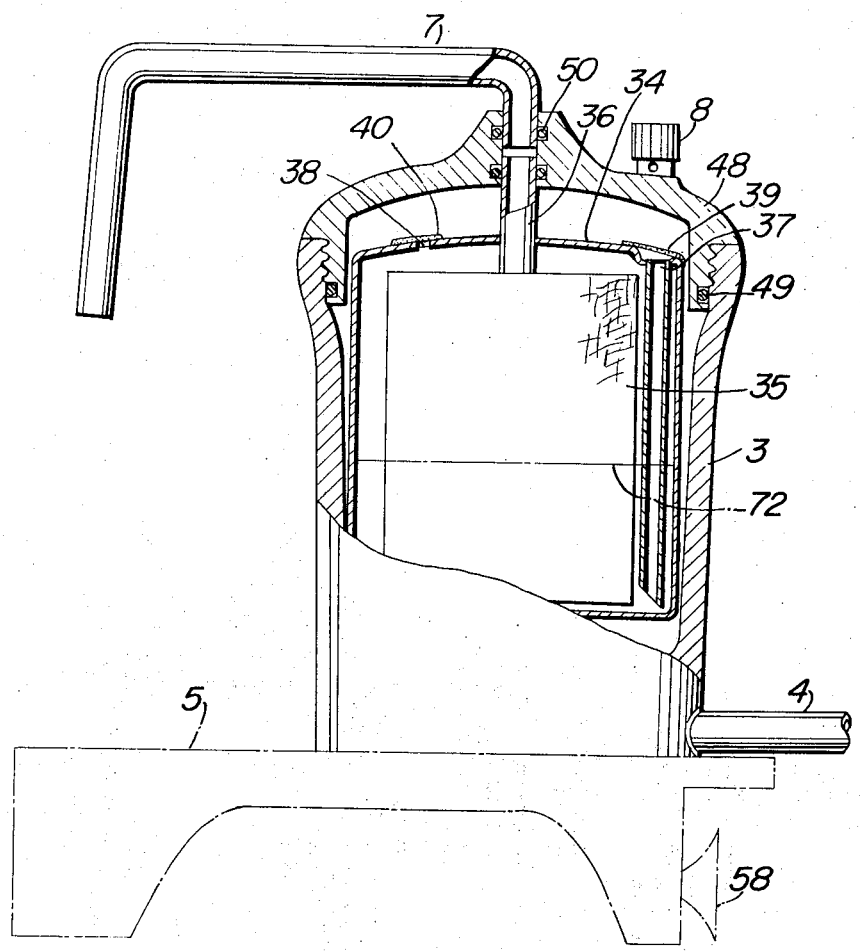
FIG. 4 is a side elevational view, partially in section, of the filter unit showing a filter case and a filter cloth case.
Figure 5:
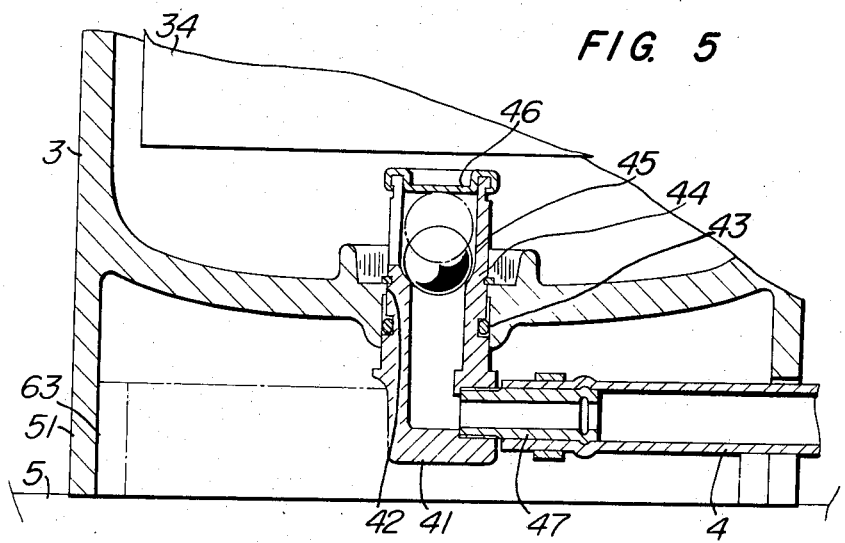
FIG. 5 is an enlarged sectional view of a portion of the filter case.
Figure 6:
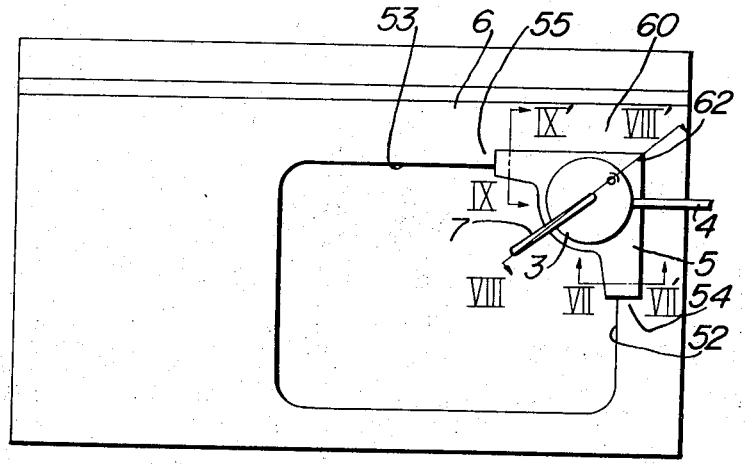
FIG. 6 is a top plan view showing the filter unit as mounted on a sink.
Figure 7:
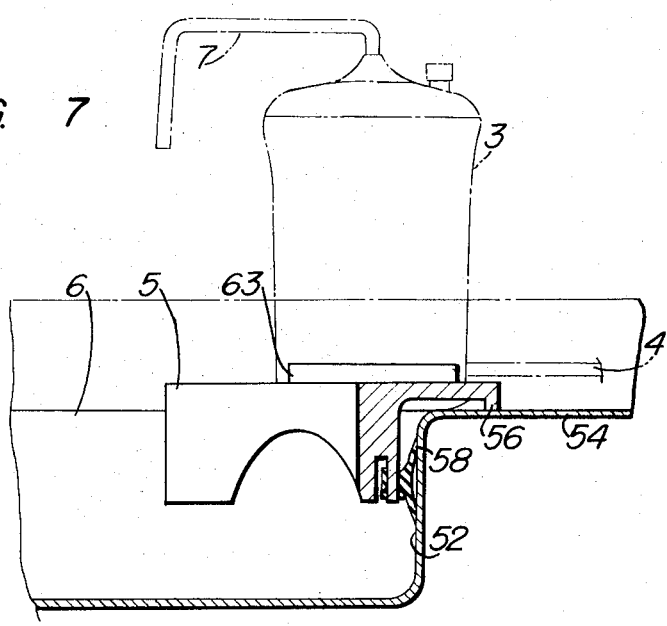
FIG. 7 is a sectional view looking in the direction of the arrows VII–VII' of FIG. 6.
Figure 8:
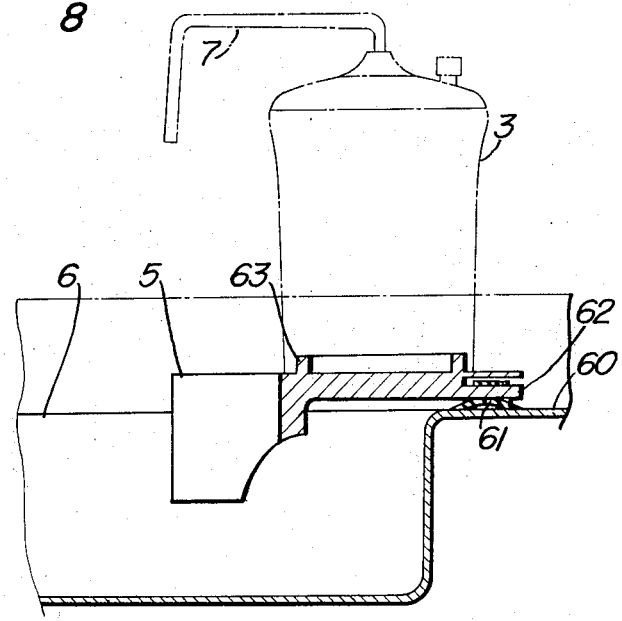
FIG. 8 is a sectional view looking in the direction of the arrows VIII–VIII' of FIG. 6.
Figure 9:
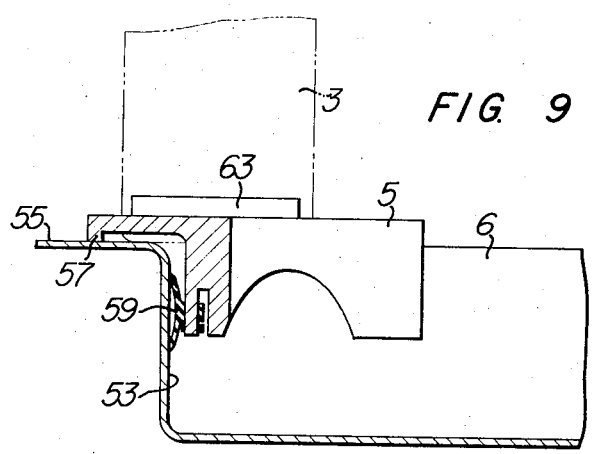
FIG. 9 is a sectional view looking in the direction of the arrows IX–IX' of FIG. 6.

Now, the construction of the filter unit 3 will be described with reference to FIGS. 4 and 5. Reference numeral 34 designates a filter cloth case disposed in the filter case 3. In the filter cloth case 34 is disposed a filter element comprising a filter cloth 35, a purified water collecting tube 36 connected to said filter cloth and active carbon powder. The filter cloth case 34 is provided with a water inlet hole 37 and a vent hole 38. The water inlet hole 37 and the vent hole 38 are temporarily closed with sheets 39, 40 of a water-soluble paper respectively. These sheets 39, 40 of a water-soluble paper are dissolved when water is introduced into the filter case 3, whereby the water inlet hole 37 and the vent hole 38 are opened. Reference numeral 41 designates a substantially L-shaped water inlet tube rotatably connected to a through-hole 42, formed in the bottom wall of the filter case 3, through an O-ring 43. At the upper end of the water inlet tube 41 is provided a check valve comprising a valve seat 44 formed at the upper edge of said inlet tube, a valve element 45 engageable with and disengageable from said valve seat, and a cover 46. A nipple 47 is fitted into the other open end of the inlet tube 41, by which the other end of the hose 4 is connected to the filter case 3. Reference numeral 48 designates a top closure cover which is removably threadably connected to the top of the filter case 3 through an O-ring 49. The purified water discharge tube 7 is rotatably connected through an O-ring 50 to the top closure cover 48 for communication with the purified water collecting tube 36. The top closure cover 48 is also provided with valve means 8 to be described later, which is in communication with the interior of the filter unit. At the bottom of the filter case 3 is formed an annular leg 51 which is adapted to be fitted around an annular projection formed on the mounting bracket 5 to be described hereinafter.

The construction of the mounting bracket 5 will be described with reference to FIGS. 6, 7, 8 and 9. The mounting bracket 5 has a substantially triangular shape and is set at a corner of a wash sink 6, formed by the adjoining side walls 52, 53 of said wash sink. Further, the mounting bracket 5 has downward flanges 56, 57 which rest on the upper surfaces 54, 55 of the adjoining two side walls 52, 53 of the sink, and suction cups 58, 59 which are attached to said side walls 52, 53 and a suction cup 61 which is attached to the upper surface 60 of the sink adjacent the corner of the side walls 52, 53. The suction cups 58, 59 prevent the mounting bracket 5 from moving toward the center of the wash sink upon disengagement of the flanges 56, 57 from the upper surface portions 54, 55 of the sink, and thereby prevent the filter unit 3 from falling into the wash sink. The suction cup 61 prevents the corner portion 62 of the mounting bracket 5 from making an upward pivotal movement about the other two corners and thereby prevents the filter unit 3 from falling into the wash sink. On the upper surface of the mounting bracket 5 is provided an annular projection 63 which fits into the annular leg 51 at the bottom of the filter case 3 when the filter unit is mounted on the mounting bracket 5.

Figure 10:
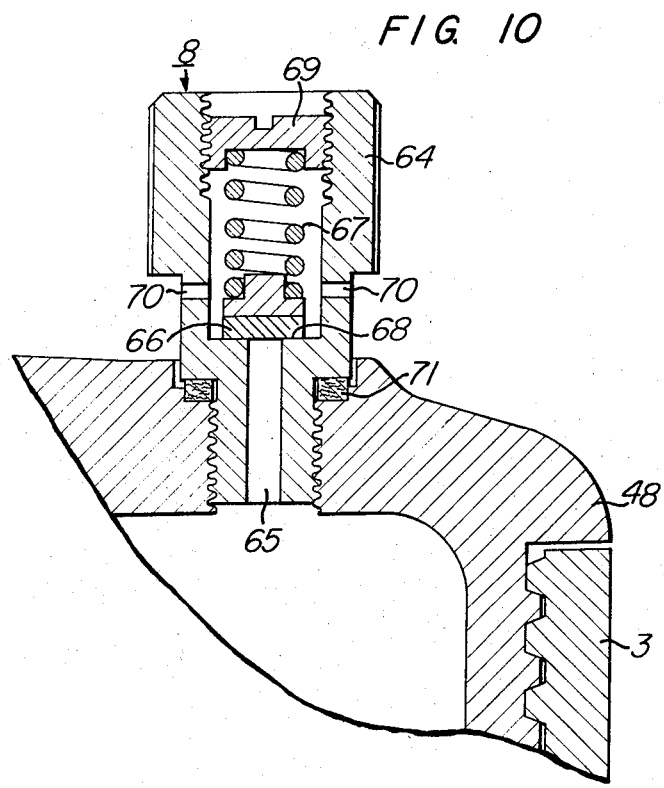
FIG. 10 is an enlarged sectional view of the valve means.

The valve means 8 is described with reference to FIG. 10. Reference numeral 64 designates a valve case screwed into the top closure cover 48 of the filter case 3 and having a small axial bore 65 communicating with the interior of the filter case 3. Reference numeral 66 designates a valve body having one side facing the axial bore 65 of the valve case 64 and the other side bearing one end of a spring 67. Thus, the valve body 66 is urged against the bottom surface 68 of the valve case 64 under the biasing force of the spring 67, so as to keep the axial bore 65 closed. The other end of the spring 67 is bearing against an adjustment screw 69 screwed into the valve case 64. It will be understood that by rotating the adjustment screw 69, the biasing force of the spring 67 applied to the valve body 66 can be adjusted. Reference numeral 70 designates pressure relief ports formed in the valve case 64, and 71 designates a packing. When the water pressure in the filter unit 3 becomes abnormally high, the water pushes the valve body 66 upwardly through the axial bore 65 against the biasing force of the spring 67 and flows to the outside through the pressure relief ports 70. Thus, the valve means 8 serves to release the pressure when the internal water pressure of the filter unit becomes abnormally high. Reference numeral 72 in FIG. 4 designates a standard level of the active carbon powder charged in a filter case 34 prior to use.

The water purifying device of the invention constructed as described above operates as follows:

When the faucet 2 is opened, service water (city water or pumped well water which has not been purified) is discharged into the valve unit 1. The discharged water passes through the passage 14 into the valve box 13. In this case, an outward leakage of water is prevented by the packing 15. When the water outlet port 17 is tightly closed by the valve ball 26 as indicated by the solid line in FIG. 2, the service water is fed into the other outlet port 18 and flows into the hose 4, connected to the nipple 31, to be introduced into the filter unit 3. In the filter unit 3, the service water is purified in the manner to be described later, and the purified water is discharged to the outside from the purified water discharge tube 7. When it is desired to obtain unpurified service water, the operating rod 28 is pushed whereby the valve ball shifting member 27 is shifted to the position indicated by the alternate long and short dash line in FIG. 2 and the valve ball 26 embraced by said shifting member 27 is rolled on the valve seat 21 to a position to close the outlet port 18. When the outlet port 18 has been closed by the valve ball 26, the service water is discharged downward from the valve unit 1 through the outlet port 17. In this case, the flow of service water is equalized by the equalizing screen 29 and equalizing plate 30, and discharged as a smooth single stream. Now, when purified water is again desired, the operating rod 28 is pushed in the opposite direction, whereby the valve ball 26 is shifted to close the outlet port 17. Namely, by shifting the valve ball 26 to a position to lead service water into the outlet port 18 in communication with the filter unit, purified water can be obtained from the purified water discharge tube 7 of the filter unit. Thus, service water and purified water can be selectively obtained as desired by simply pushing the operating rod 28 in one or the other direction.

Furthermore, the operation of the operating rod can be achieved in one step. The flow rate of water can be adjusted or the supply of water can be stopped by manipulating the faucet 2 in either case when service water is being used or when purified water is being used. The operating rod penetrating portions of the valve box 13 are sealed by the O-rings 32, so that the operation of the operating rod 28 is smooth and no water leaks thereat. The valve ball shifting member 27 is closely spaced from the inwardly projecting wall portion 33 of the valve box 13 and hence is not allowed to incline. Therefore, the valve ball 26 is always correctly positioned in the through-hole 19 or 20 of the valve seat 21 and an outward leakage of water, otherwise occuring, can be prevented. The valve seat 21 is secured in position with the downward annular projections 22, 23, formed along the peripheral edges of the through-holes 19, 20, received in the upper portions of the outlet ports 17, 18 and resting on the annular steps 22, 23 formed around the peripheral edges of the upper ends of said outlet ports respectively. Such construction enables the through-holes 19, 20 to be perfectly aligned with the outlet ports 17, 18 during assembly of the valve unit, and prevents the valve seat 21 from separating from the valve box 13 and lifting during rolling of the valve ball 26 thereon. Therefore, a leakage of water otherwise caused by the separation of the valve seat 21 from the valve box 13 can be completely avoided. In mounting the valve unit 1 on the faucet 2, the mounting box 9 is first of all connected to the end of the faucet by the small bolts 10 and then the valve box 13 is screwed into the mounting box 9. In this case, the packing 15 is interposed between the mounting box 9 and the valve box 13 in such a manner that the upper surface of said packing 15 is pressed against the end of the faucet 2. Thus, the mounting of the valve unit 1 is simple and a leakage of water from the junction between the valve unit 1 and the faucet 2 can be completely prevented.

The service water passing in the hose 4 from the outlet port 18 of the valve unit 1 flows into the water inlet tube 41 and thence into the filter case 3 while pushing the valve body 45 of the check valve upwardly. The water introduced into the filter case 3 flows into the filter cloth case 34 from the water inlet hole 37 and is filtered by the layer of active carbon powder formed on the outer surface of the filter cloth 35 and said filter cloth 35. The filtered water is collected in the purified water collecting tube 36 and discharged to the outside from the discharge tube 7.

The water inlet hole 37 and the vent hole 38 of the filter cloth case 34 are initially closed with the sheets 39, 40 of a water-soluble paper. These sheets of water-soluble paper serve to prevent the active carbon powder from scattering to the outside of the filter cloth case 34 during transportation of the water purifying device from the manufacturing plant to the place of use, and also during transportation of a new filter cloth case to the site of the water purifying device when the filter cloth case in said purifying device is desired to be exchanged due to degradation of filtering efficiency after use for an extended period. In the filter cloth case 34, the active carbon powder is merely poured after the filter cloth 35 and the purified water collecting tube 36 are mounted therein, and therefore, the active carbon powder is freely movable therein. The sheets 39, 40 of a water-soluble paper are provided to prevent the active carbon powder from scattering to the outside. These sheets 39, 40 of a water-soluble paper are readily dissolved by the water flowing into the filter case 3 to open the water inlet hole 37 and the vent hole 38. Namely, when the water is passed through the filter case for the first time after the water purifying device is mounted or the filter cloth case 34 is exchanged with a new one, the sheets 39, 40 of a water-soluble paper are dissolved in a few seconds by contact with water. The water flowing into the filter cloth case 34 through the thus opened water inlet hole 37 fills said filter cloth case from the bottom while being mixed with and stirring the active carbon powder. In this case, the air interior of the filter cloth case 34 is discharged into the filter case 3 through the vent hole 38 and then discharged to the outside of the filter case 3 when the valve means 8 is demounted. The water rising in the filter cloth case 34 while stirring the active carbon powder, in the meantime, fills said filter cloth case and discharges to the outside through the discharge tube 7 when the valve means 8 is mounted. During passage of the water through the filter cloth 35, the active carbon powder is retained on the outer surface of said filter cloth, forming a layer of active carbon powder thereon, and thereafter the water is filtered by said active carbon layer. As described, the scattering of the active carbon powder can be prevented and the active carbon layer can be automatically formed on the surface of the filter cloth 35 only by the passing water through the filter unit.

The mounting bracket 5 is set at the corner of the wash sink 6 formed by the two adjoining side walls 52, 53 of said wash sink. A water purifying device is usually mounted in the proximity of a sink and most commonly on a cooking table or shelf adjacent the sink. However, when the filter unit is placed on the cooking table or shelf, it interferes with the cooking operation or storage of cooking instruments, and also reduces the space available for such operations. In the present invention, it is proposed to place the filter unit at a corner of the wash sink 6 formed by two adjoining side walls 52, 53 of said wash sink. It is particularly advantageous to place the filter unit at either one of the two corners on the far side of the wash sink. This is because the corners on the far side of the wash sink are rarely used when untensils or vegetables are washed in said wash sink, and the filter unit placed thereat does not constitute an obstacle to such operation. (In the embodiment shown, the filter unit is placed at the right side one of the corners on the far side of the wash sink 6.)

The mounting bracket 5 is provided with the suction cups 58, 59, 61. These suction cups 58, 59, 61 prevent the filter unit, mounted on the mounting bracket 5, from falling into the wash sink. The filter unit is mounted on the mounting bracket 5, with the annular projection 63 on the upper surface of the latter fitted into the annular leg of the filter case 3. Therefore, in no case will the filter unit slidingly move on the mounting bracket 5 and fall into the wash sink.

The water inlet tube 41 is pivotally connected to the filter case 3, so that the hose 4 can be extended from the filter case in any direction. This is convenient in that the filter unit can be placed at the corner on either side of the wash sink. The check valve is provided in the water inlet tube 41, which renders the construction of the filter unit simple and enables a reliable reverse flow preventing effect to be obtained. The purified water discharge tube 7 is also pivotally, so that purified water can be obtained in any direction as required, no matter in which position of the sink 6 the filter unit is set. The valve body 66 of the valve means 8 is actuated under a high pressure built up within the filter case 3 to release the pressurized water to the outside. This valve means 8 is provided for the purpose of preventing a breakage of the filter case 3 when the internal water pressure of the filter case becomes abnormally high. The flow resistance of the filter cloth 35 and the active carbon layer to the water passing therethrough becomes large when the meshes of said filter cloth and active carbon layer are clogged with dust or other foreign matters removed from the water during use of the water purifying device for a long period of time. The internal pressure of the filter case 3 becomes high also in such case. The valve means 8 when actuated lets the user know of the fact that the filtering efficiency has been degraded and the filtering elements need to be exchanged or regenerated. The valve means 8 is provided with knurling on the outer surface thereof and demountable from the top closure cover 48. When the water is passed through the filter case 3 for the first time, the valve means 8 is demounted and the air interior of said filter case can be released to the outside.

As described above, the water purifying device of the invention enables service water and purified water to be selectively freely obtained as desired by the operation of the valve unit 1 mounted on the discharge end of the faucet 2. The purified water may be used only when pure water for drinking or other purposes is desired. Therefore, by selectively controlling the flow direction of the service water, the useful life of the filter unit can be prolonged. Further, the flow direction of the service water can be changed very simply in a one-step fashion, merely by pushing the operating rod 28 provided on the directional control valve unit 1. The valve ball 26 is rollably mounted on the valve seat 21 which has formed therein the through-hole 19 in communication with the service water outlet port 17 and the through-hole 20 in communication with the outlet port 18 communicating with the filter unit, and is rollably shifted by the valve ball shifting member 27 which is connected to the operating rod 28 and embraces the valve ball 26. Therefore, the valve ball 26 can be shifted easily and located in the through-hole 19 or 20 to positively close the outlet port 17 or 18 water-tight. The valve ball 26 and the valve seat 21 are subjected to no friction during the flow direction changing operation, and hence subjected to no wear. Therefore, the directional control valve unit 1 can be used semi-permanently with no leakage of water. The leakage-free characteristic of the directional control valve unit 1 is further enhanced by the packing 15 and the O-rings 32. These packing 15 and O-rings 32 also facilitate the mounting of the valve unit 1. The water inlet hole 37 and the vent hole 38 of the filter cloth case 34 are tentatively closed with the sheets 39, 40 of a water-soluble paper which prevent the scattering of the active carbon powder to the outside of the filter cloth case 34 during transportation of the water purifying device. These sheets of a water-soluble paper are instantaneously dissolved when service water is passed through the filter unit for the first time after mounting of the water purifying device, so that water flows into the filter cloth case 34 from the inlet hole 37, stirs the active carbon powder to form an active carbon layer on the surface of the filter cloth 35 and is discharged to the outside through the discharge tube 7. Thus, the active carbon layer can be formed automatically on the surface of the filter cloth 35. The manufacturer of the water purifying device is not required to form the active carbon layer at the manufacturing plant, but only required to charge the active carbon powder in the filter cloth case 34.

The mounting bracket 5 is set at a corner of the wash sink 6 and the filter unit is mounted on said mounting bracket. Therefore, the available cooking space is not reduced by the filter unit and the cooking or washing operation is not substantially interfered with by the mounting bracket 5. Further, the mounting bracket 5 is secured to the sink 6 by means of the suction cups 58, 59, 61 and the filter unit 3 is secured to the mounting bracket 5 through interlocking engagement. Therefore, there is no fear of the filter unit falling into the wash sink. Furthermore, the filter unit can be conveniently used no matter which one of the corners of the wash sink 6 it may be set to, since the water inlet tube 41 and purified water discharge tube 7 are pivotable.

It is also to be noted that, since the valve means 8 is provided on the top closure cover 48 of the filter case 3 which is operable under an abnormally high pressure built up within said filter case, a breakage of the filter case caused by such abnormally high water pressure can be prevented and the user can learn of the degradation of the filtering efficiency due to clogging of the filter elements.

Thus, according to the present invention it is possible to obtain a water purifying device having such excellent features as set forth above.

What is claimed is:

1. A water purifying device comprising a filter unit including a filter case (3), a filter element disposed in said filter case (3), a water inlet tube (41) and a purified water discharge tube (7) connected to said filter element; a directional control valve unit (1) having a water outlet port (17) for discharging service water and another water outlet port (18) for communication with said filter unit, and an outwardly projecting operating rod (28) by which said outlet ports (17, 18) are alternately opened and closed for changing the flow direction of service water; and a hose (4) communicating said water inlet tube (41) of said filter unit with said water outlet port (18) of said directional control valve unit (1) wherein said directional control valve unit (1) further includes a mounting box (9) fixedly mounted on the discharge end of a faucet (2) by means of small bolts (10), a valve box (13) having said outlet ports (17, 18) therein and screwed into the underside of said mounting box (9), a packing (15) interposed between said mounting box (9) and said valve box (13) and having the upper surface thereof in pressure contact with the discharge end of said faucet (2), a valve seat (21) having through-holes (19, 20) and disposed on top of said valve box (13) with said through-holes (19, 20) in registration with said outlet ports (17, 18) respectively, a valve ball (26) of a size large enough to close either one of said outlet ports (17, 18) and shiftably mounted on said valve seat (21), a valve ball shifting member (27) connected to said operating rod (28) and embracing said valve ball (26), O-rings provided at the portions of said valve box (13) where said operating rod (28) reciprocally penetrates, a flow equalizing screen (29) and a flow equalizing plate (30) mounted in said outlet port (17), and a nipple (31) connected to said outlet port (18).

2. A water purifying device comprising a filter unit including a filter case (3), a filter element disposed in said filter case (3), a water inlet tube (41) and a purified water discharge tube (7) connected to said filter element; a directional control valve unit (1) having a water outlet port (17) for discharging service water and another water outlet port (18) for communication with said filter unit, and an outwardly projecting operating rod (28) by which said outlet ports (17, 18) are alternately opened and closed for changing the flow direction of service water; and a hose (4) communicating said water inlet tube (41) of said filter unit with said water outlet port (18) of said directional control valve unit (1) wherein said filter unit is mounted on a mounting bracket (5) with an annular projection (63) formed on the upper surface of the latter being received in an annular downward mounting leg of the filter case (3) of the former, said mounting bracket (5) being secured to a corner of a wash sink (6) formed by the adjoining two side walls (52, 53) of said wash sink by means of suction cups (58, 59, 61) attached to said two side walls (52, 53) and the upper surface of said sink; said water inlet tube (41) having a substantially L-shape; said filter case (3) having a through-hole (42) formed in the bottom wall thereof to which one end of said water inlet tube (41) is pivotally connected through an O-ring (43); a check valve comprising a valve seat (44) and a valve body (45) being provided at the upper end of said water inlet tube (41); said hose (4) communicating with said directional control valve unit (1) being connected to the other end of said water inlet tube (41); and said purified water discharge tube (7) communicating with said filter element being pivotally connected to the upper wall of said filter case (3) through an O-ring (50).

* * * * *